United States Patent [19]

Zeno

[11] Patent Number: 4,841,292
[45] Date of Patent: Jun. 20, 1989

[54] THIRD DIMENSION POP UP GENERATION FROM A TWO-DIMENSIONAL TRANSFORMED IMAGE DISPLAY

[75] Inventor: John R. Zeno, New York, N.Y.
[73] Assignee: Allied-Signal Inc., Morris Township, Morris County, N.J.
[21] Appl. No.: 895,065
[22] Filed: Aug. 11, 1986
[51] Int. Cl.⁴ ............................................. H04N 15/00
[52] U.S. Cl. .................... 340/736; 340/799; 342/180; 358/3; 358/88; 358/92; 364/522
[58] Field of Search ............... 340/736, 723, 724, 729, 340/747, 799, 793; 342/185, 180; 358/2, 3, 89, 90, 91, 92, 88; 364/522

[56] References Cited

U.S. PATENT DOCUMENTS

| | | | |
|---|---|---|---|
| 3,140,415 | 7/1964 | Ketchpel | 342/180 X |
| 3,566,021 | 2/1971 | Jakes, Jr. | 358/90 |
| 3,602,702 | 8/1971 | Warnock | 364/522 |
| 3,765,018 | 10/1973 | Heard et al. | 342/185 |
| 4,384,338 | 5/1983 | Bennett | 364/522 |
| 4,441,104 | 4/1984 | Finney, II | 340/724 |
| 4,506,296 | 3/1985 | Marraud et al. | 358/88 |
| 4,558,359 | 12/1985 | Kuperman et al. | 358/89 |
| 4,625,290 | 11/1986 | White | 364/522 |
| 4,642,621 | 2/1987 | Nemoto et al. | 340/799 X |
| 4,673,929 | 6/1987 | Nelson et al. | 340/793 X |
| 4,682,217 | 7/1987 | David et al. | 358/89 |
| 4,737,921 | 4/1988 | Goldwasser et al. | 364/522 X |
| 4,775,858 | 10/1988 | Stapleton et al. | 340/747 X |

OTHER PUBLICATIONS

Plott, Jr. et al., "A Real-Time Stereoscopic Small-Computer Graphics Display System"; IEEE Trans. on Systems, Man, and Cybernetics; (vol. SMC-5, No. 5; 9/75; pp. 527-533).

Primary Examiner—Theodore M. Blum
Assistant Examiner—Bernarr Earl Gregory
Attorney, Agent, or Firm—Howard G. Massung

[57] ABSTRACT

A bit map image is stored as a two-dimensional array with z axis set arbitrarily at unity. Total rotation transform and screen projection is then treated as a lumped equation due to multiplicative associativity so long as only one variable "V" is included in each lumped equation. The z-data (stored elevation values corresponding to each bit map x/y coordinate) is re-inserted as a later operation after the image has been partially transformed and projected.

Full yaw, pitch, and translations from virtually any perspective viewpoint may be projected onto a multiplicity of screen shapes (conical, spherical, flat, etc.), with z data being inserted into a final output.

4 Claims, 10 Drawing Sheets

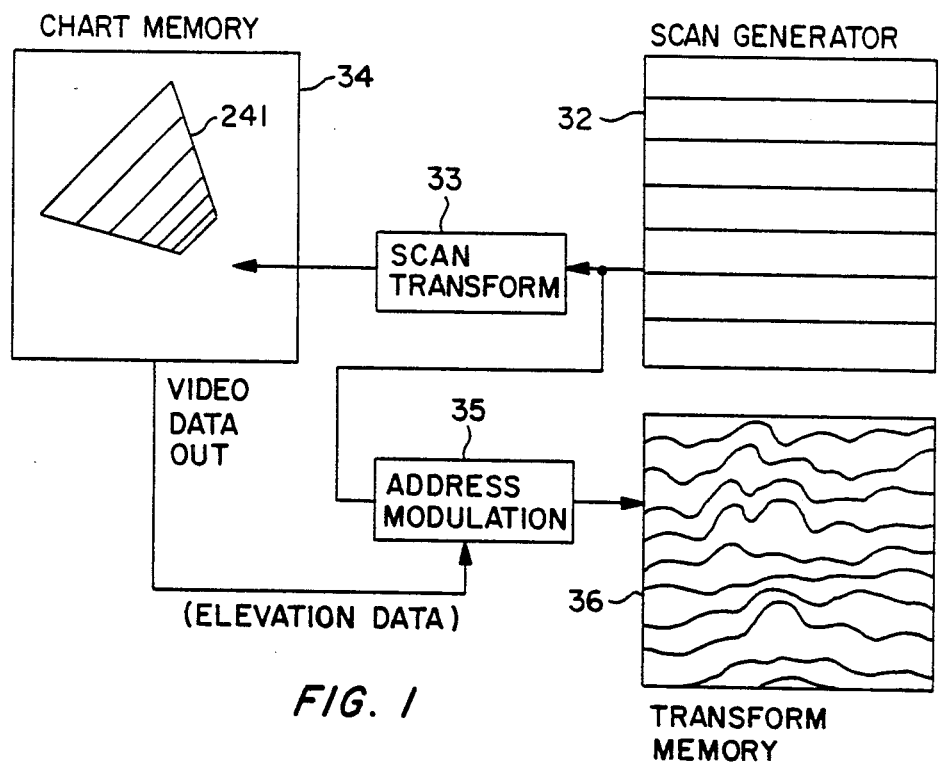
FIG. 1
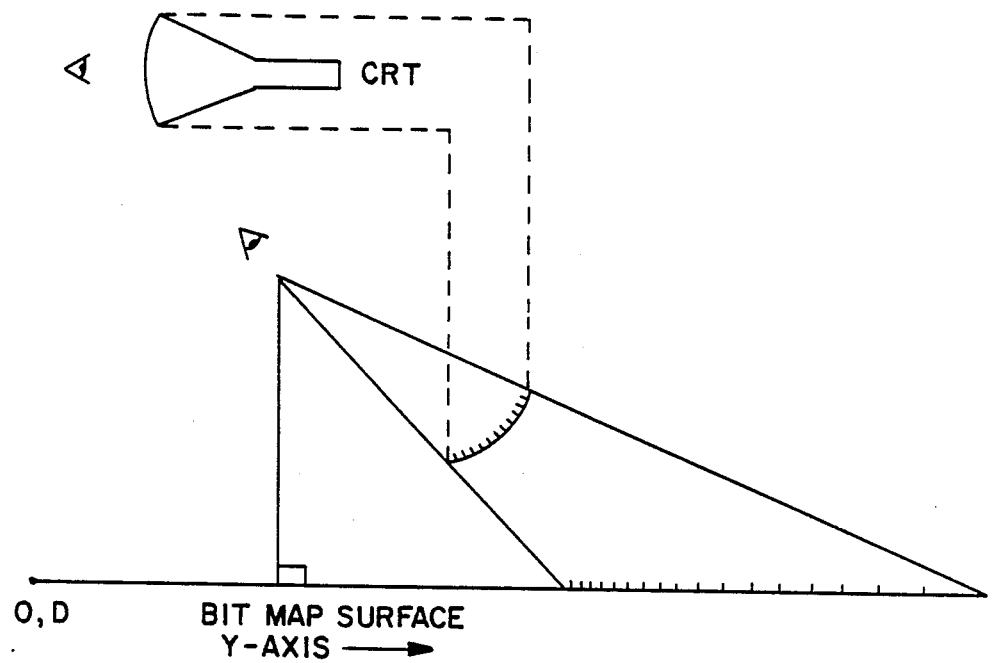
FIG. 2.1

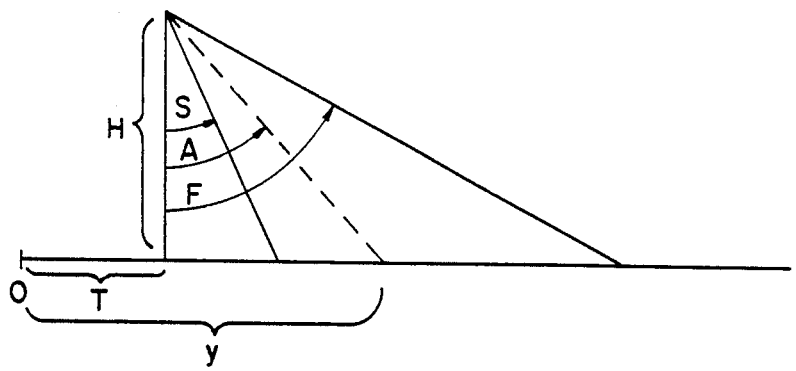
FIG. 2.2
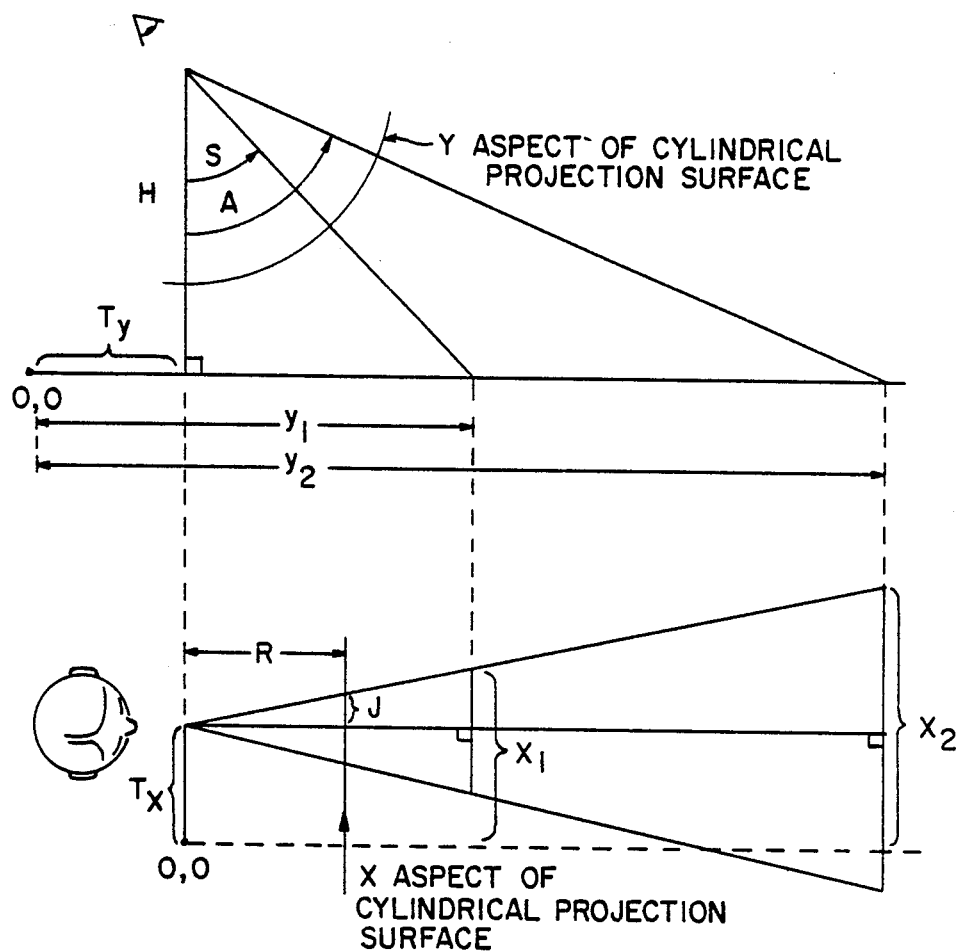
FIG. 2.3

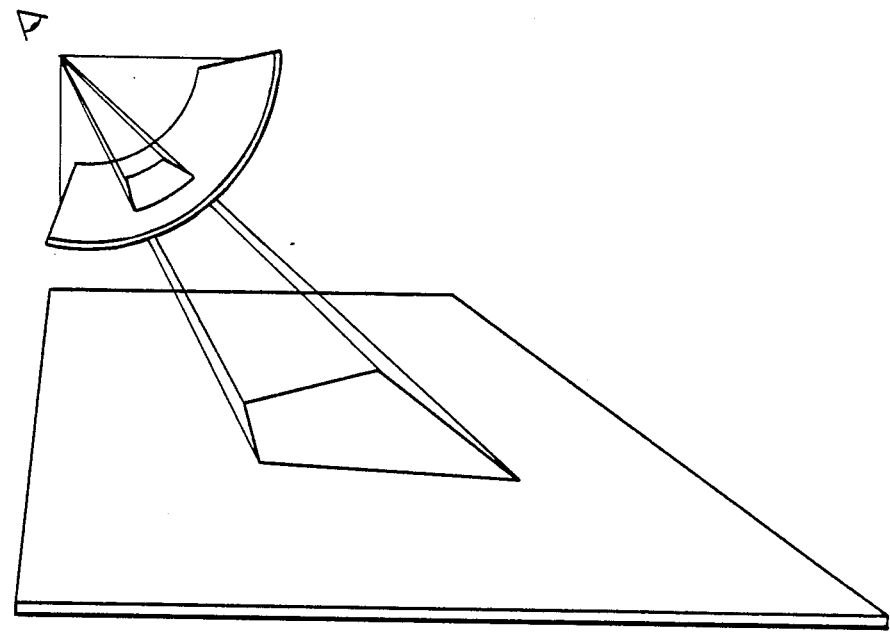
FIG. 2.4
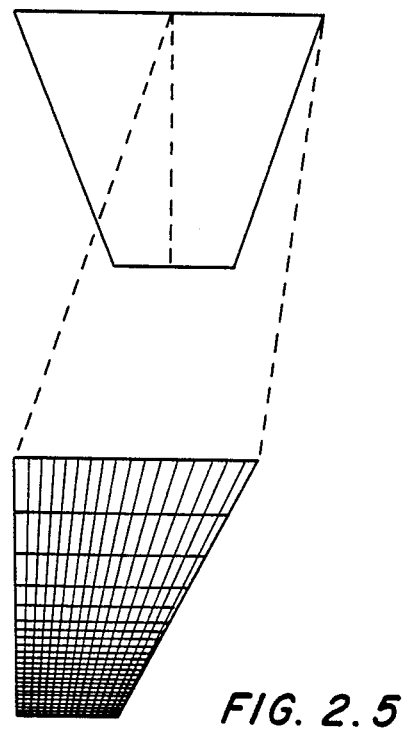
FIG. 2.5

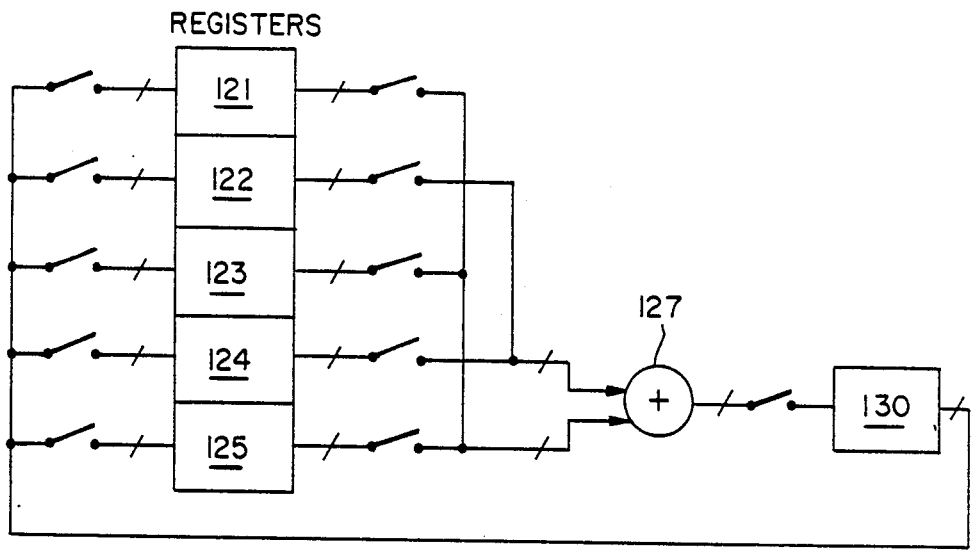
FIG. 7
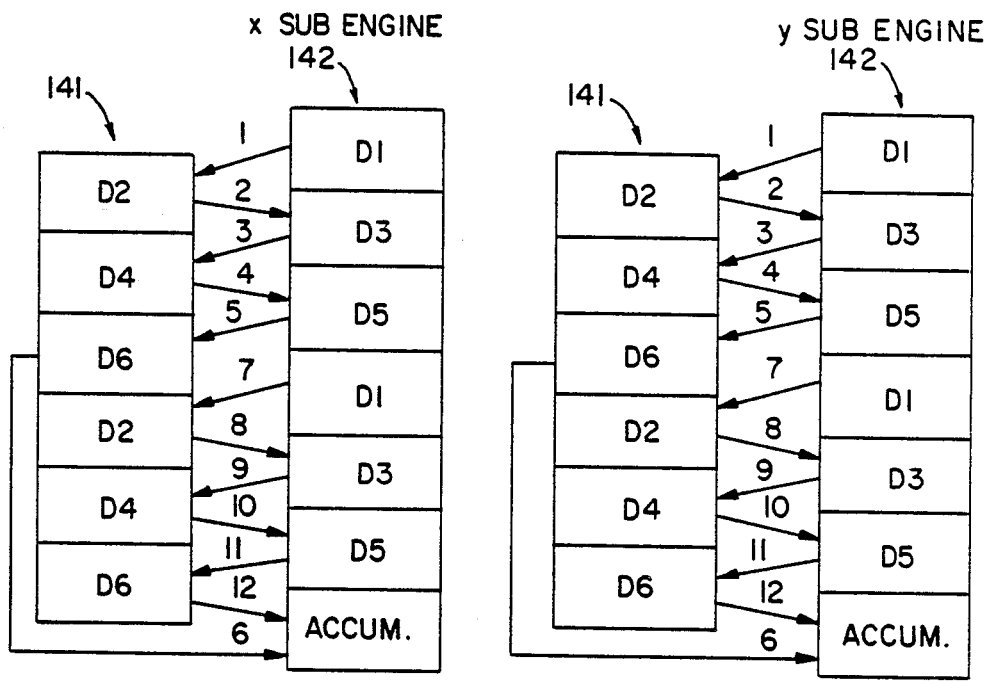
FIG. 8.1   FIG. 8.2

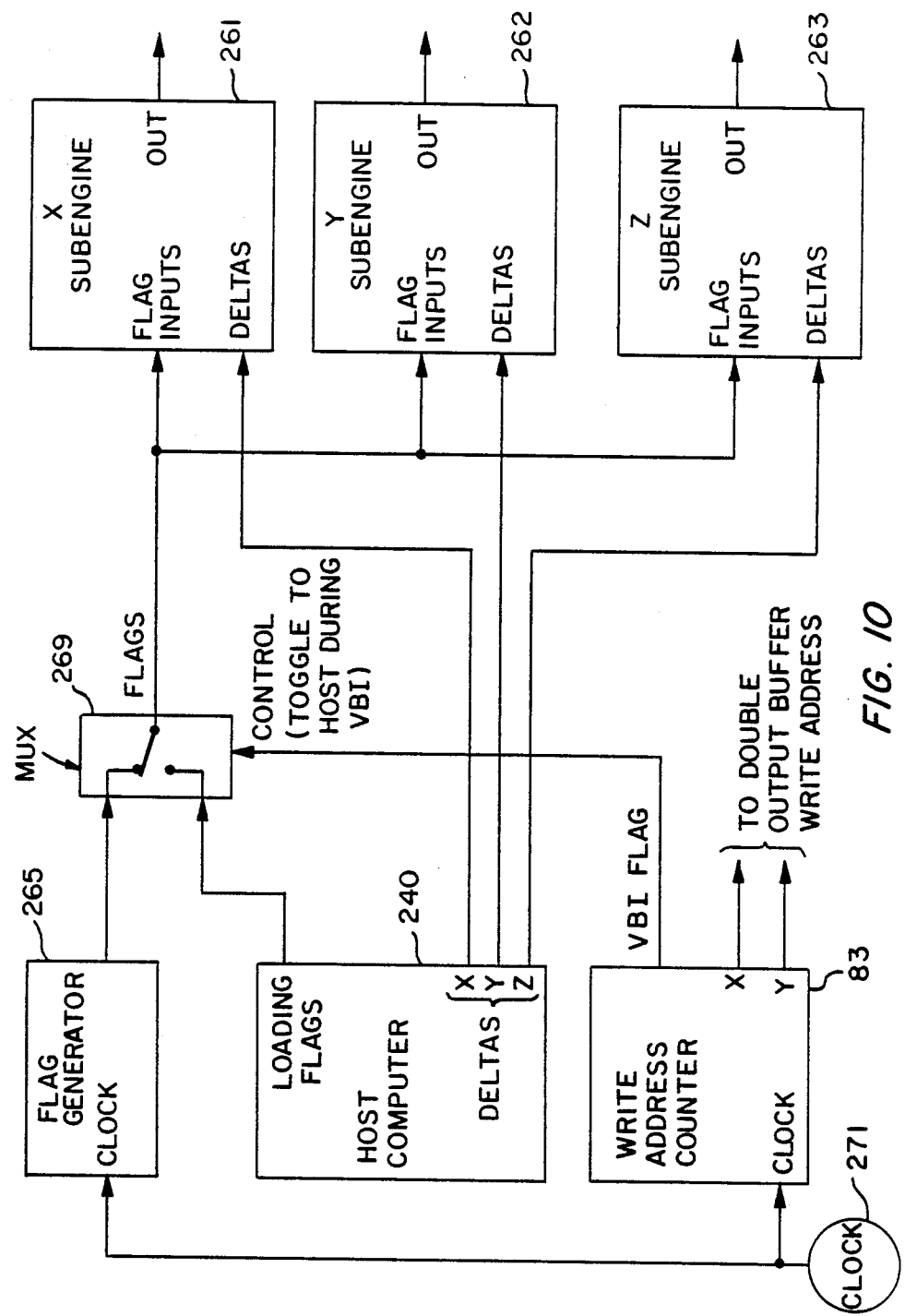

THIRD DIMENSION POP UP GENERATION FROM A TWO-DIMENSIONAL TRANSFORMED IMAGE DISPLAY

FIELD OF THE INVENTION

This invention relates to digital computers and more specifically to circuitry therein for solving the polynomial equation: $f(V) = k + aV + bV^2 + cV^3 + dV^4 + \ldots + zV^n$. The invention has particular utility in the conversion, compression, and restoration of digital encodations into video intelligence such as may be used with video map displays generated from digitally encoded maps.

More specifically, the invention is related to a moving map display and in particular to a moving map display in which the map data is electronically stored and the desired portion of the map may be viewed with realistic perspective on a cathode ray tube.

BACKGROUND OF THE INVENTION

It is often desirable to provide the operator of a vehicle with a map showing the topographical features of the terrain immediately surrounding the vehicle. This is particularly true for the pilot of an aircraft where the terrain may be obscured by cloud cover or darkness. Some of the advanced radar systems are capable of generating an image of the terrain immediately surrounding the aircraft. The generated map contains only limited information, and the radar image must be correlated with a navigational map in order to provide the pilot with the necessary information, such as labels identifying pertinent topographical features and recognizable landmarks. Alternatively, map displays have been developed in which the map is stored on one or more positive microphotographic transparencies such as taught in German Pat. No. 26 25 597, Richardson, et al. in U.S. Pat. No. 3,652,836, and Aron, et al. in U.S. Pat. No. 4,427,994. These microphotographic transparencies are projected in the operator's field of view and are capable of being moved in two orthogonal directions to keep the vehicle's coordinates in the center of the displayed portion of the map. In some of these systems, the transparency or even the whole projector system may be rotated so that the top of the displayed map coincides with the heading of the vehicle.

Evans, et al. in U.S. Pat. No. 4,179,693 disclose an autonomous check point navigational system for an airborne vehicle in which flight path is periodically checked and corrected by comparing the composition of features of an associated electronically stored reference map. The system electronically stores a plurality of reference maps, one for each check point and the addresses of the detected terrain features are modified to correct for an angular misalignment between the sensed map and the reference map.

An electronic moving map display such as disclosed by Seitz, et al. in U.S. Pat. No. 4,484,192 overcomes the disadvantages of the projected map and check point navigational systems and provides for increased versatility. Such electronic maps have been dependent on the storage capacity of electronic memories. Where electronic map data is compressed, required memory capacity has been reduced at the expense of difficulty in achieving real-time regeneration of a detailed map structure from the compressed data. The data compression techniques which traditionally have offered the greatest compression ratios unfortunately have generally required difficult decoding algorithms. Specifically, a polynomial compression method wherein a curve is stored, not as a multiplicity of points but instead as coefficients to a standard equation, offers a high compression ratio. This applies especially for lines and curves, which convey much of the useful map information. Unfortunately such a polynomial requires the evaluation of exponential terms in order to regenerate the data, requiring either extended processing time or extensive specialized hardware.

In addition, an electronic map would in theory allow the viewer to manipulate the orientation of the map in three dimensions, with six degrees of freedom and full perspective and relief. The transformation equations (such as those involving rotations) have been especially difficult to solve at video ("pixel") rates since the equations involve trigonometric functions and various multiplications. Then, in order to compress the transformed video data into two dimensions (for display on a conventional cathode ray tube), it has been necessary to use additional projection equations which involve division operations which must be performed on the results of the transform equations. Not only does this method require the use of multiplication, division, and trigonometric operations, but certain operations must be performed serially; that is, the division operation must be performed on the results of the previous trigonometric and multiplicative steps.

It would therefore be highly desirable to replace this known mathematical sequence with another (perhaps approximate) method which could achieve similar results, to the limit of cathode ray tube resolution, at conventional video pixel rates.

SUMMARY OF THE INVENTION

In order to reconstruct a compressed vector we must define end points and plot the linearly-interpolated values, assuming that a line is desired. Although this can be easily accomplished by a microprocessor, this task becomes more complex when curves, the most frequently used connected function, are to be encoded. We might refer to a look-up table containing precomputed values for standard curves, but a significant error will develop when real structures are to be encoded using standard arcs.

The invention uses a standard equation which is capable of generating a great variety of curvilinear shapes by merely specifying coefficients. These coefficients may or may not exactly reproduce the line, depending upon the complexity of the particular line. A line may be reproduced to any desired degree of exactitude by using a polynomial expression of sufficient terms; the resolution of the display tube will define the maximum resolution we need and hence, the exact number of coefficients. We may also elect to allow a further error in order to reduce the number of coefficients to be processed and stored. Permissable error is monitored in the chosen encoding technique such as by an encoding computer; whenever the permissable curvilinear error is exceeded, the line is then split into two segments, and each reanalyzed. This process recurses if either segment again exceeds the permissable error using the maximum available number of coefficients.

Any connected function (i.e.: any function without a discontinuity) can be represented by such a polynomial of the form:

$$f(V) = k + aV + bV^2 + cV^3 + dV^4 + \ldots + zV^n$$

where:
a–z are various coefficients
k is an offset constant
V is the input variable
n is the highest exponent associated with a non-zero coefficient For curves which do not fit this format (such as circles, which have more than one "y" value for each "x" value), it would be necessary to first divide the curve at appropriate points so as to induce functions which may be approximated to the requisite degree using the standard polynomial format. The time required to compute this encoding algorithm will have no inhibiting effect upon a computer reconstructing the curve.

Therefore, it is seen that a specialized high-speed polynomial-solving computation device ("engine") for reconstructing compressed data will permit this important class of data compression to be utilized.

Once a map database has been "decompressed" by appropriate means it can be stored in an electronic random-access memory as a collection of data points. Each data point has a two-dimensional address. This can be accomplished using any memory whose address lines can be partitioned into separate "x" and "y" axes. Some microprocessor-based memories insert a lookup table or other conversion function to rearrange contiguous addresses into discontinuous memory locations for most efficient use of the available memory matrix. In either case, the effect is to store the map image as a directly-addressable "orthogonal" set of address axes, commonly called a "bit map".

It is known that various image distortions can be created by raster scanning this bit map in an orthogonal manner and yet mapping them onto a display tube (or other bit map) in a non-orthogonal fashion. This constitutes an image transform operation.

Conversely, one may scan the display device orthogonally while reading the bit map for corresponding video data in a non-orthogonal pattern, creating an image transformed from that in a direction corresponding to the nonorthoginal pattern. For convenience this latter method is implemented herein; however, the invention relates to either scanning direction.

The invention herein generates both orthoginal and non-orthogonal numeric axes using a high-speed polynomial computation engine which is loaded, by a controlling switching device such as a conventional microprocessor ("host computer"), with precise numeric differentials.

The host computer reduces the desired polynomials to a set of differentials which are supplied to the engine for subsequent computation. These differentials are found by reading a table of differences based on a diagonal row of differences in a polynomial table computed in a manner first applied by Charles Babbage and well known to mathematicians. This method solves a complex higher-order polynomial using only the operations of addition and subtraction. The number of additions required to solve a polynomial equation in increments from a given starting value is simply the same as the power of the highest exponent used (whose coefficient is not equal to zero).

These differentials are added in cascade at rates derived from scan rates of both the x and y axes of the (linear) display raster scan, corresponding to pixel clock and line count, respectively. Each set of differentials is summed by an accumulator, which integrates the sum of differentials, synthesizing both arithmetic multiplication and exponentiation using only addition operation. Subtraction (or negative coefficients) is avoided, thereby reducing hardware and increasing speed, by substituting the "2's complement" of the number to be subtracted.

In order for a polynomial to be evaluated by this highly economical method it must be executed from a starting value "V" and calculated for subsequent "V" values which are separated from the starting value by a constant difference (increment). By transforming the image in the direction specified (non-orthogonal map addresses being displayed orthogonally in a raster scan format), we can use the display device's scan x and y positions as "V" input values to various polynomial equations. Then we can solve each polynomial using the table since the starting value is specified and each subsequent address is a uniform increment. These polynomials are summed by an accumulator to form two numeric outputs, constituting the x and y address lines to the bit map.

A typical polynomial computation engine performs the following sequence of iterative additions for each polynomial desired:

$$D2 = D2 + D1$$
$$D3 = D3 + D2$$
$$D4 = D4 + D3$$
$$D5 = D5 + D4$$
$$D6 = D6 + D5$$

where D1–D6 are deltas derived using table of differences.

In this example, D6 acts as the numeric output (solution) of the polynomial generator. The deltas themselves are derived by constructing a table of differences from a collection of seven solutions of the polynomial using actual coefficients, and using these differences as the deltas.

The deltas may be solved as follows:

$$\Delta = k + aV + bV^2 + cV^3 + dV^4 + eV^5 + fV^6$$

where
a–f are coefficients, and
V = desired variable starting value
$\Delta$ = desired increment of variable
a–f = coefficients
k = constant of integration Six deltas may be solved as follows First Delta =
$V^5 (6\Delta F) +$
$V^4 (15\Delta^2 F + 5\Delta E) +$
$V^3 (20\Delta^3 F + 10\Delta^2 E + 4\Delta D) +$
$V^2 (15\Delta^4 F + 10\Delta^3 E + 6\Delta^2 D + 3\Delta C) +$
$V (6\Delta^5 F + 5\Delta^4 E + 4\Delta^3 D + 3\Delta^2 C + 2\Delta B) +$
$F\Delta^6 + E\Delta^5 + D\Delta^4 + C\Delta^3 + B\Delta^2 + A\Delta$ Second Delta =
$V^4 (30F\Delta^2) +$
$V^3 (120F\Delta^3 + 20E\Delta^2) +$
$V^2 (210F\Delta^4 + 60E\Delta^3 + 12D\Delta^2) +$
$V (180F\Delta^5 + 70E\Delta^4 + 24D\Delta^3 + 6C\Delta^2) +$
$62F\Delta^6 + 30E\Delta^5 + 14D\Delta^4 + 6C\Delta^3 + 2B\Delta^2$ Third Delta =
$V^3 (120F\Delta^3) +$
$V^2 (540F\Delta^4 + 60E\Delta^3) +$
$V (900F\Delta^5 + 180E\Delta^4 + 24D\Delta^3) +$
$540F\Delta^6 + 150E\Delta^5 + 36D\Delta^4 + 6C\Delta^3$ Fourth Delta =
$V^2 (360F\Delta^4) +$
$V (1440F\Delta^5 + 120E\Delta^4) +$ -continued $$\text{Fifth Delta} = \frac{1560F\Delta^6 + 240E\Delta^5 + 24D\Delta^4}{V(720F\Delta^5) + 1800F\Delta^6 + 120E\Delta^5}$$

$$\text{Sixth Delta} = 720F\Delta^6$$

The first solution is taken by specifying V at the initial desired solution for the polynomial and the incrementing V by a uniform amount for the remaining solutions. The purpose of this process is to condition a section of the polynomial curve (which extends from −infinity to +infinity) so that it will be generated by the engine beginning at the desired point on the curve and incrementing so that it reaches the desired endpoint after 512 iterations. The number of iterations is controlled by the number of elements in each picture display axis, which is 512 in actual implementation for both axes.

Of great importance is that the engine can mimic many functions by using deltas conditioned to generate various sections of multivarious polynomials. The length of the polynomial can easily be extended beyond six deltas, and the number of deltas (minus two) indicates the number of slope reversals of the polynomials. The extreme speed of the algorithm as well as the preferred embodiment allow the polynomial to easily be extended to a many more delta terms.

The engine is thus a general-purpose device which can be used for many applications other than image transformation and image decompression.

Differentials are provided by a host computer only once per video frame, after which the polynomial engine generates approximately 250,000 solution sets (x/y address pairs) to the map at high speed. This yields a data stream (consisting of color, hue, intensity, culture information (canals building roads) or altitude data associated with each map point selected) from the map memory which may be directly displayed orthogonally or re-mapped into a second video buffer, also orthogonally. This second video buffer is used when it is desirable to incorporate any of the following features:

i. isolate the image computation rate from the display (scan conversion);

ii. temporarily store a static image for continuous display while the host computer performs other tasks (including updating the bit map chart image);

iii. perform image roll. This is done using a second engine operating as the read address controller to the second bit map;

iv. incorporate z-axis data from the chart map which will modify the y position of the writing address for three dimensional perspective generation.

An image which is transformed by reading the map non-orthogonally and re-mapping the resultant data in an orthogonal fashion is especially well suited to the production of real-time video since the orthogonal scan line and pixel variables, corresponding to a linear CRT raster-scan (NTSC standard), may serve as incremental numeric inputs to the right-hand side of the afore-mentioned polynomial equations. These incremental numeric input are used by an engine which solves two polynomials for each axis of the bit map. In other words, a constant increment is input as the "V" term appearing on the right-side of each polynomial.

By arranging the transform direction in this manner, two advantages result:

i. every computation corresponds to map data which will be displayed at a valid CRT address;

ii. a typical projection equation (to be described) requires the tangent function. In the inverse transform direction, an arctangent function would be required, which is not well suited to polynomial computation due to negative exponents.

In natural vision, perspective relationships are perceived by reducing the three dimensional relationships among visual objects into the two dimensions of the retina. The lens of the eye acts as a point through which each ray must travel before being imaged (projected) onto the retinal screen. Although the retinal screen is located behind the lens (for precise focus), the mathematics which establish the perceived relationships can be applied to screens either before or behind the point where rays converge (viewpoint). The radius between the screen and the viewpoint affects the general scale but not the relative positions of image elements.

Modern photography usually employs a flat film surface which acts as the projection screen onto which rays fall. However, the eye utilizes a curved (nearly spherical) retina as its screen. It is a property of spherical screens that rotation of the viewpoint about its center ("panning" about the nodal position) causes no change in the shape of a projected object, but only a change in its general position. This advantageous property is exploited by the eye whereas flat photographic films are plagued with distortion towards the edges. A "compromise" projection surface consisting of a cylinder may be synthesized by taking the y coordinates of the spherical screen and the x coordinates of the planar screen. The resultant surface embodies four desirable traits:

i. Realistic perspective is obtained along the vertical axis of the CRT (which normally corresponds to the flight direction);

ii. "Wide-angle" distortion effects are reduced due to x-axis linearity;

iii. Solution of a complex trigonometric function or its polynomial equivalent is required only once for each y axis increment (scan line). A simpler linear calculation is required at the x axis (pixel) rate;

iv. The polynomial coefficients may be adjusted to display the map as a relatively flat surface, a concave cylinder, or a convex cylinder in perspective. The latter effect resembles the Earth's horizon and is quite useful as an enhanced display when sun angle shading is shown even without the use of elevation data, which may additionally be used to further modify this general shape.

Although the present invention is not limited to cylindrical projections, it has been found to be both mathematically economical as well as visually advantageous to model the y-axis polynomials after tangent functions.

The bit map image exists as a two-dimensional array without z axis (at this stage in the total system). By setting z arbitrarily at unity, we may eliminate the need to incorporate the division operation necessary to project the three dimensions onto a two-dimensional screen. Hence, the total rotation transform and screen projection may be treated as a lumped equation due to multiplicative associativity so long as only one variable "V" is included in each lumped equation. Since two display axes exist as inputs, and two new axes must be generated as outputs, four lumped polynomial are solved for all transform possibilities, accomodating yaw rotations.

The z-data (stored elevation values corresponding to each bit map x/y coordinate) is re-inserted as a later operation after the image has been partially transformed and projected.

The present invention consists of a number of identical polynomial computation engines, each of which provides numerical outputs at high speed that are the contiguous solutions for polynomial expressions whose particular coefficients have initially been provided by a host processor. These coefficients are supplied as a string of "delta values" as derived from a table of differences or the preceeding formulae along a diagonal beginning at the first desired solution. The polynomial may consist of "lumped constants" wherein several polynomials having the same variable are combined by collecting terms. This is particularly useful when more than one multiplication against the same variable is required.

The contiguous solutions begin at some specified starting value and continue as the variable "V" is increased by a uniform, specified increment. The variable "V" represents either the horizontal (pixel) scan axis or the vertical (line) axis, depending upon which polynomial we are considering. Normally each complete engine consists of four polynomial generators which generate four polynomials arranged into two axes, each axis having a polynomial whose variable "V" is the line number and having another polynomial whose variable "V" is the pixel number. In practice, for cylindrical projections, two polynomials are used, each having a line variable only, but one is multiplied against the pixel variable by successive additions. This method of solution is well suited to conventional raster-scan television (such as NTSC, PAL and SECAM) wherein each axis is scanned in a uniform and incremental manner. By using these two incremental axes as inputs ("V" values) to at least two polynomial engines (operating in parallel), the system can produce in real time address pairs which can read the map memory in such a way that, when re-mapped or displayed at a uniform linear rate, virtually any image perspective may be achieved.

It has been found that the use of four such polynomial generators is especially powerful for producing tranformations which exhibit full yaw, pitch, and translations from virtually any perspective viewpoint as projected onto a multiplicity of screen shapes (conical, spherical, flat, etc.).

These four polynomials are apportioned to generate four outputs:
1. Chart memory x axis initial position per scan line: "V"=CRT y position.
2. Chart memory x axis incremental amount per pixel: "V"=CRT y position * pixel number
3. Chart memory y axis initial position per scan line: "V"=CRT y position
4. Chart memory y axis incremental amount per pixel: "V"=CRT y position * pixel number This group of four polynomial generators constitutes a digital differential engine for perspective transformations.

Such an arrangement allows yaw motion about the map by resolving the CRT's pixel axis (CRT x-axis) into both bit map (chart memory) x-axis and chart memory y-axis polynomials which increment at a pixel rate. Hence a purely horizontal scan is converted into a diagonal map scan. Conversely, the CRT's y axis, whose address changes at only the line rate, must be resolved into both map y and map x components for yaw to be generated.

The roll axis may be produced by applying a second transform to the image produced by the first transform system, using a second complete engine operating upon the output of the first engine.

Further, the same polynomial engine device may be used to create complex x and y-axis numeric series based on a comparatively small number of coefficient inputs. These numeric series may be plotted as coordinate points into a video bit map, creating complex curvilinear shapes at high speed. In this manner, the polynomial engine becomes a powerful data decompression system.

A complete system includes, in addition to the polynomial engines, two image frame buffers: a large one for chart image storage (of at least $1K \times 1K \times 12$ bits); and a smaller one actually composed of two $724 \times 724 \times 8$ bits in a double buffer configuration for output scan conversion and/or isolation. Scan conversion is necessary if the map's z-axis data has been set to zero artificially in order to simplify the transformations and perspective, after which point it must be reinserted as a "pop-up" (vertical modulation) of the y-coordinate before roll is added.

x-y-z Translations, zoom (magnification), yaw, and pitch (perspective) are generated when the engine addresses the first image buffer in various ways. Roll is generated when a second engine addresses the second (double output) buffer.

The actual generation of the various axes of freedom lies in the real time generation of a variety of digital address sequences, which are then fed to the two buffers mentioned. To depict dynamic motion these sequences must change from frame to frame. Such movement may be controlled either manually or proportional to external inputs such as bearing, altitude, and other information.

The provision for manually-controlled perspective will permit the user to essentially "fly" through the map space, greatly improving her ability to perceive the three dimensional details of the terrain. A special cache memory look-up table facility is provided to occult hidden lines based on the y-axis value of pixels previously drawn in the foreground into the output buffer.

The system will produce shaded areas using eight bits of elevation data stored within the 12 bits of each x/y pixel in the large map buffer, and this information may be conveyed using any color transfer function desired including discontinuous functions which are useful in presenting contour histographs. Data representing culture features on four levels comprise the remaining four bits of the twelve-bit word stored for each map pixel, and these cultural "planes" may be combined using Boolean logic in conjunction with the elevation data. This technique will allow compression of many more planes of cultural information within just four since many cultural features (e.g.: man-made structures) cannot overlap and therefore do not require separate planes. Hence we can, for example, discriminate during display between runways and buildings merely by keeping an external table of the actual elevations of certain buildings and digitally masking for only those cultural features on the man-made cultural plane at that elevation. Or, we may apply the logical "and" function between two cultural planes and select only objects which belong to both groups of cultures. The twelve bits per pixel may also be used to represent red-green-blue hues for airchart displays or photographs.

In accordance with the present invention, a scan pattern corresponding to an image transformation is generated, and the scan pattern is used to address a selected image portion from a bit map. Information from the bit map is then retrieved and is used to generate a new scan pattern, in which third dimensional features of the image appear displaced.

By using the inventive techniques, image manipulation can be rapidly effected, with third dimensional representations on two dimensional media inserted subsequent to preliminary image manipulation.

BRIEF DESCRIPTION OF THE DRAWINGS

FIG. 1 is a diagram of the preferred scan and data path;

FIGS. 2.1–2.5 are geometric diagrams of a possible projection transform;

FIG. 7 is a block diagram showing storage registers for polynomial computation;

FIGS. 8.1 and 8.2 are block diagrams showing the use of two RAMs per polynomial set according to the invention;

FIG. 10 is a block schematic diagram showing a polynomial engine such as Engine #1 in FIG. 5.

DETAILED DESCRIPTION OF THE PREFERRED EMBODIMENT

Figure 3:
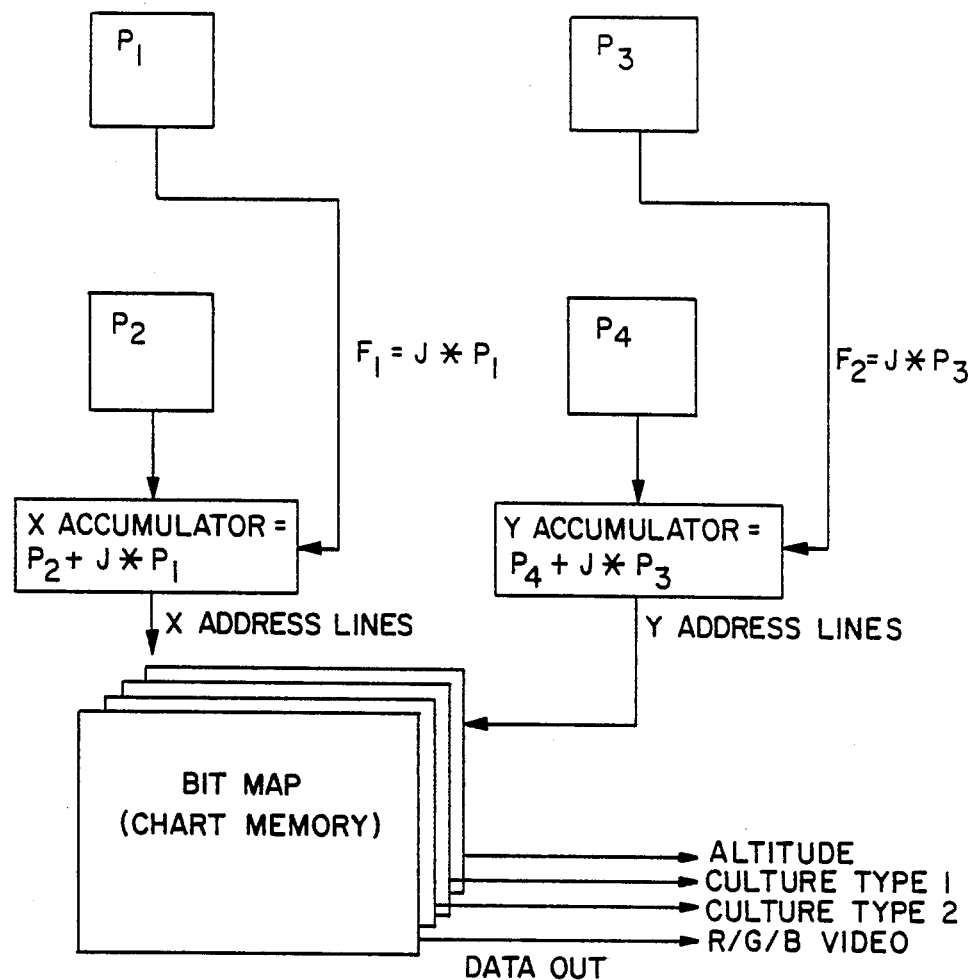
FIG. 3 is a block diagram representation of engine #1.

A video image is written into a frame buffer or "bit map" at power-up. Thereafter, it will be updated only during the vertical blanking interval (VBI) as either a horizontal or vertical strip update. This accomodates the actual translation of the vehicle's position.

If the system finds that it is unable to update enough information during the VBI to match the vehicle's movement, which is more likely when traveling along the diagonals of the bit map, then a special warning bit is sent to the decompacting computer or other bit map reading device, demanding that the entire scale of the bit map be changed so that a larger terrain is remapped into the same bit map space. This will of course reduce the absolute resolution.

The digital differential engine will generate x and y-axis addresses which directly access pixels within the bit map. The sequence of addresses may either be a linear scan (similar to the CRT scan) in order to produce orthogonal images (with zoom or wide-angle effect if either small or large increments are used, respectively) with translations, effected by inserting an offset constant into the accumulator of each axis.

In the case of non-linear address sequences, these create a wide variety of perspective effects depending upon the exact numerical functions generated. In the preferred embodiment, the usual image manipulation sequence is mathematically operated in "reverse". That is, the conventional art teaches that an object (map) is first rotated, then projected onto a screen, and finally scanned from the screen for television display. However, as shown in FIG. 1, it has been found preferable to first generate x and y linear numerical sequences, i.e.: scanning (block 32). Then an inverse projection pattern is generated from these inputs (block 33), followed with an inverse rotation onto the object (block 34). From this transform a screen address is transformed into a map address, from which data is read regarding map qualities (color, altitude, culture) and transferred to a display 36 as a map datum. Object z data (altitude) is used to modify the display position, represented by Block 35.

In this preferred sequence, each axis consists of a linear element (scan) which the x-axis generates at a pixel rate while the y-axis generates at a line rate. The second operation (inverse projection) has been modeled as projection onto a cylindrical surface for convenience, although any other shape may be substituted.

In FIG. 2.1 the y axis of the inverse projection scheme is considered. The 512 scan lines of the cathode-ray tube ("CRT") are distributed equally as angular increments along a section of the cylindrical projection surface. A start and stop angle is established, corresponding to the cone of view desired. The centering of the span of this cone defines the observer pitch axis while the magnitude of the 512 angular increments establishes the total degree of the cone and hence the magnification or "zoom".

In FIG. 2.2 a start angle ("S") is shown for the cone while a typical projected angle, "A", is shown corresponding to any of the 512 lines composing the scanned image in the y axis. A stop angle, "F", defines the limits of the linear angular increments of the scanning process: In FIG. 2.2, $$\frac{y-T}{H} = \tan(A)$$

$$y - T = H \tan(A)$$

$$y = H \tan(A) + T$$

$$A = \left(I \frac{F-S}{512}\right) + S,$$

where

I = any scan line number 0–511.

The actual inverse-projected spot (which falls on the chart memory bit map and whose data is read) is y:

y = H * Tan (A) + T, where T is a translation offset.

Thus the y axis is demonstrated as bein proportional to a tangent function where the angular variable is the display y-axis scan increment. In order to maintain straight lines in a perspective view of the chart map, the x axis transformation must be proportional to the y axis. This is shown in FIG. 2.3 where $x_1$ and $x_2$ represent the entire width of the x axis transformation. In reality, both $x_1$ and $x_2$ are each composed of 512 short segments, representing the pixels within each transformed scan line. R is an arbitrary radius to the cylindrical screen and J is the length of any pixel. To illustrate pixel scanning, J may be incrementally increased in 512 steps until it occupies the full scan width. Within any scan line, e.g.: $x_1$, the projected x is linearly proportional to J, and this desirable trait is exploited by the preferred engine embodiment which uses successive addition to simulate this (linear) multiplication:

$$\frac{x_2 - Tx}{y_2 - Ty} = \frac{J}{R}$$

$$x_2 - Tx = \frac{J}{R}(y_2 - Ty) = \frac{J}{R} H \tan A$$

$$x_2 = \frac{J}{R} H \tan(A) + Tx$$

Replace tan (A) by polynomial in variable V:

$$p = k_1 + a_1 V + b_1 V^2 + c_1 V^3 + d_1 V^4 + \ldots + z_1 V^n;$$

$$x_2 = J \frac{H}{R} P + Tx$$

$$y_2 = HP + Ty,$$

where J=pixel variable and the terms $H_1$ R and Tx are constants and P=line variable polynomial.

If $k_2 = H/R$, then by associativity, the $k_2$ term can be distributed into all coeffcents of p:

$$x_2 = Jk_2 P + Tx = JP_3 + Tx,$$

where $$P_3 = k_2 P$$

$$y = H P,$$

then $$y = P_1 + Ty.$$

If $$P_1 = H P,$$

then $$y = P_1 + Ty.$$

Then Ty may be lumped into the constant term of $P_1$.

In order to set J we may invoke the known aspect ratio of CRT; this will permit us to derive the x axis transform directly from the y.

FIG. 2.4 shows how a two-dimensional display window representing the CRT is inverse-projected from the cylindrical screen onto the bit map (chart). Since the aspect ratio of the cathode-ray tube is known, then it is possible to derive the x transform from the y using this ratio. For example, if the aspect ratio is 1:1, then we can postulate that the foreground pixels should project as squares (whereby their projected height equals their projected width.) In other words, th eprojected increment between the first and second y lines should equal 512 times the projected pixel width (since there are 512 pixels per scan line.) This is shown in FIG. 2.5. In this figure, we see a typical inverse-projection trapezoid which creates a perspective view. This trapezoid should be symmetric about its y axis when a centered view is desired. However, if an off-center image is desired, a portion of the symmetric trapezoid may be expanded as shown and used instead to scan the chart memory. In either case, the taper of the scan lines should follow the tangent function as previously described, and the x pixel width should be proportional to the tangent function for straight lines. This is shown in the detail of the off-center trapezoid segment. In practice it is not possible using any mapping technique to render a three-space view (even of a 2D surface in 3D space) as perfectly conformal on a 2D projection screen and there is always a compromise between line straightness, preservation of angles, and equality of areas over the entire projection screen.

While a 2D projection screen or a flat display surface is described, it should be noted that many cathode ray tubes (CRTs) do not present true flat display surfaces. For purposes of describing the image manipulation, they are usually treated as flat. For the purposes of this invention, a flat display surface is meant to include the slightly curved surface common to many CRTs, as well as other curved surfaces commonly used for flat projection displays.

Generally, it is not desired to center the y axis as we centered the x axis because this creates an image where we can see both the horizon behind us as well as the horizon in front of us; a great deal of distortion is perceived, similar to an extreme "fish-eye lens" effect. Therefore only the x axis transform requires this symmetry.

To generate this symmetry, we must specify an initial point for the x axis which drifts left as we progress upwards in our scan from foreground to background. This is accomplished by adding an offset "initial" polynomial which is $-\frac{1}{2}$ the value of the total scan width (which is 512 times the pixel width "incremental" polynomial).

This "initial" polynomial is solely a function of the line variable. The pixel or "incremental" polynomial is actually the product of a second line variable polynomial times the pixel count. This multiplication is synthesized by successive addition every pixel. It is important to understand that this convenient property of cylindrical projections (which permits the use of successive additions instead of neccessitating the solution of an entire polynomial at pixel rates) is not meant to limit the scope of this disclosure to exclude the use of such pixel-variable polynomials.

Due to this successive addition technique, it is not possible to lump the two polynomials together because the initial polynomial must not be a function of the pixel count. Therefore the y inverse-projection transform becomes $$y = P_1 + k_1$$

where:
  $P_1$ is a polynomial whose variable is a linear line count function, and
  $k_1$ is a constant,
while the x inverse-projection transform is $$x = P_2 + J P_3 + k_2$$

where:
  $P_2$ is a polynomial whose variable is a linear line count function and controls symmetry;
  $P_3$ is a polynomial whose variable is a linear line count function and controls both perspective and line straightness;
  J is a variable which is a linear pixel count function;
  $k_2$ is a constant.

Yaw is applied by cross-coupling these two equations in the standard Euler rotation. The sine and cosine terms are treated as constants since they do not change during the frame:

$$x = \cos(A)*x + \sin(A)*y$$

$$y = \cos(A)*y - \sin(A)*x$$

where
A = Yaw angle
If $k_3 = \cos(A)$, and $k_4 = \sin(A)$, then:

$$x = k_3*x + k_4*y$$

$$y = k_3*y - k_4*x$$

Substituting, $$x = k_3*(P_2 + J*P_3 + k_2) + k_4*(P_1 + k_1)$$

$$y = k_3*(P_1 + k_1) - k_4*(P_2 + J*P_3 + k_2)$$

Expanding, $$x = k_3*P_2 + J*k_3*P_3 + k_2*k_3 + k_4*P_1 + k_1*k_4$$

$$y = k_3*P_1 + k_1*k_3 - k_4*P_2 - J*k_4*P_3 - k_2*k_4$$

By associativity, we may lump together any polynomials which share one and the same variable, and we may lump together any constants.

$$x = P_4 + J*P_5 + k_5$$

$$y = P_6 + J*P_7 + k_6$$

where:

$$P_4 = k_3*P_2 + k_4*P_1$$

$$P_5 = k_3*P_3$$

$$k_5 = k_2*k_3 + k_1*k_4$$

$$P_6 = k_3*P_1 - k_4*P_2$$

$$P_7 = k_4*P_3$$

$$k_6 = k_1*k_3 - k_2*k_4$$

Then, as a further reduction, $k_5$ is lumped into the constant term of $P_4$ and $k_6$ is lumped into the constant term of $P_6$. Thus our final requirement is:

$$x = P_4 + J*P_5$$

$$y = P_6 + J*P_7$$

$P_4$ and $P_6$ are the x and y "initial" polynomials, respectively, which specify the starting value for each scan line. $P_5$ and $P_7$ are the x and y "incremental" polynomials, respectively, which specify the pixel increment during each scan line.

This reduces hardware requirements to 4 polynomial generators which operate at a line rate, two of which are multiplied against a linear pixel rate. This multiplication is synthesized by successive addition.

Each axis requires the same polynomial capabilities. Incidentally, the final y requirement permits for a symmetric y transform in the same way as the x did, so in fact it becomes possible to create an image from one horizon to the other.

This convenience allows us to solve both the inverse projection as well as the inverse rotation as a single operation using polynomials as nonlinear function generators.

A digital differential engine is shown in FIG. 3 as the preferred embodiment for evaluating these polynomials. This operates by integrating successive differentials, thereby creating the operation of multiplication by simple addition. The linear equation J*P, in fact, is synthesized by successive addition. Successive polynomial solutions are formed by successive use of the same multiplication synthesis in order to synthesize exponentiation. Hence, a sixth order power term is evaluated by six serial (recursive) additions.

As mentioned, each bit map axis requires this system of summations of polynomials, linear function, the lumped constant. It has been found most expeditious to maintain each axis as an independent hardware unit, and communication between them is for yaw cross-coupling most facilely accomplished by the coordination of the differentials supplied to the two engines by a separate host.

The host is, in the preferred embodiment, a host computer, although a switching device may be utilized, in which timing (clock) pulses can be transmitted, as well as information used to control the differential engines. Because of the relative high frame frequences used with most video systems, switching would likely be done by automatic means such as a computer.

The arrangement of FIG. 3 shows a combination of four polynomial solution generators $P_1-P_4$. This arrangement, referred to as Engine #1, is capable of linear as well as perspective transformations of a flat map surface. z-axis data will be inserted as a later operation. In FIG. 3, the four polynomials are solved once per scan line; however, the results of P1 and P3 are iteratively added to the accumulator every pixel, synthesizing the above-mentioned pixel multiplication (F1 and F2)

Figure 4:
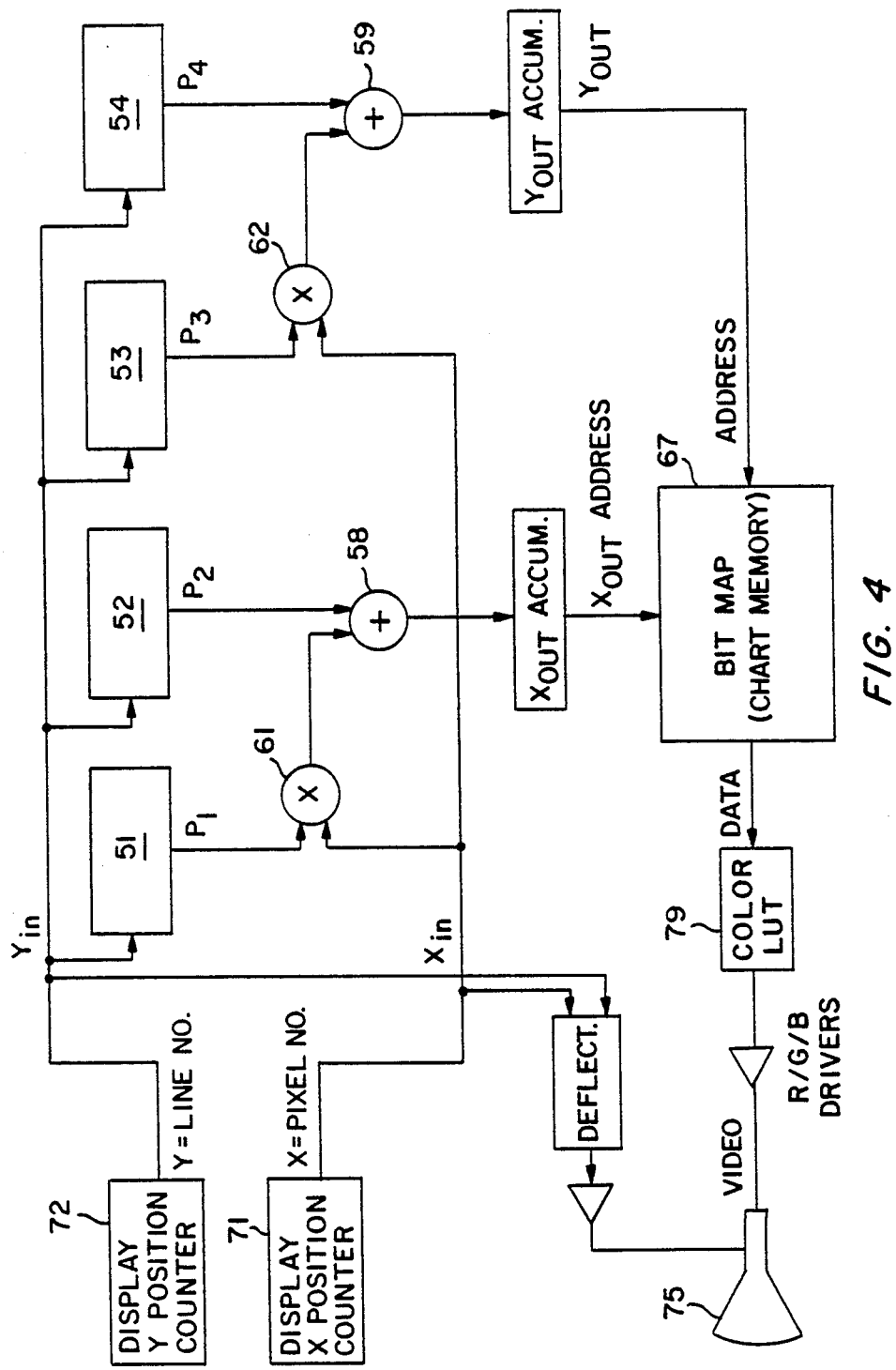
FIG. 4 is a block diagram of a simplified perspective engine.

FIG. 4 shows a simplified perspective engine which includes four polynomial generators 51-54. Each generates a numeric output based on various coefficients in the general polynomial:

$$f(V) = k + aV + bV^2 + cV^4 + \ldots + zV^n$$

where
V = y position variable (scan line counter).

Adders 58-59 perform continous addition using either P2 or P4 as the "initial" position which only changes at the end of each scan line. These initial values define the x/y position of starting point of each transformed scan line. In practice, they are used to manipulate the location of the vanishing point of a perspective view.

Multipliers 61, 62 exist not as hardware devices but instead signify a virtual multiplication accomplished by successive addition, occuring once per pixel. The "Display x Position" is achieved by 512 successive additions performed over the length of a visible scan line. In practice it is found that the numeric outputs of P1 and P3 must normally be very small since the multiplication by 512 occurs and the results must not overflow the address space of a chart memory 67. Therefore, it is most efficient to divide (by binary shift) outputs P1 and P3 before the iterative addition (virtual multiplication) represented by 61 and 62.

x and y accumulators are in reality merely the terminal memory locations in polynomial generators 51 and 53 respectively. At the end of each scan line they are cleared and the new values from polynomial generators 52 and 54 are brought forward (loaded) to the accumulator via the adder inputs of adders 58, 59. This simplified perspective engine uses just one pair of x and y counters 71, 72 to simultaneously scan a CRT 75 orthogonally as well as act as the input variables to the polynomial generators 51–54 and the virtual multiplier 61, 62. A simple color look-up table (LUT) 79 and conventional deflection processors generate the necessary analog voltages required by the CRT 75.

Engine #1 consists of three sub-sections, the x, y, and z sub-engines, which will be described in connection with FIG. 10. Each of these is a complete engine unit, but since they may be operated in parallel by a common controller, it is most efficient to operate these as a single "engine" using a common "flag generator".

Figure 5:
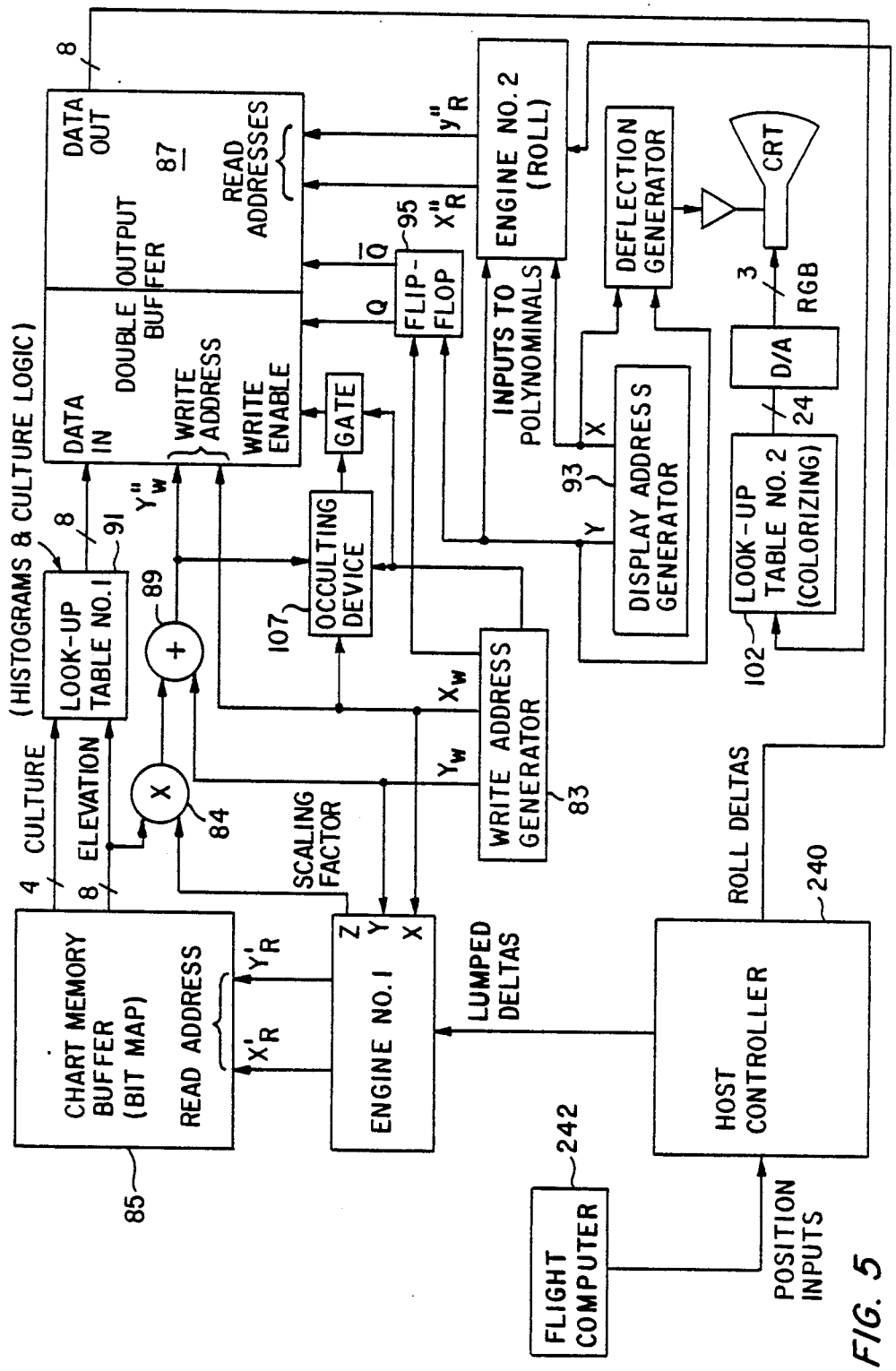
FIG. 5 is a block diagram of an expanded system with terrain elevation data.

Referring to FIG. 5 the chart memory (containing the image to be transformed) is addresses by the x and y numerical outputs of Engine #1. The z output is programmed by its deltas to act as a scaling factor, which diminishes the amount of "pop-up" created by any particular display (DTED) elevation value as the image is scanned by the x and y engine outputs from foreground to background. This effectively scales the z information to match the x and y scale at every point in the perspective transform. Depending upon the exact deltas fed to the z sub-engine, either a multiplier (84), a divider, or a look-up table can be used to accomplish the modulation of the DTED elevation data by the scaling factor.

A write address generator 83 (actually part of the engine timing control section) deposits the data fetched from a chart memory into a double output buffer (DOB) 87. This is written in as a non-interlaced scan. Although Engine #1 is generally operated from the foreground to background (image bottom to top), it is possible to write the image form top to bottom, corresponding to background and foreground, respectively. The engine can be programmed using appropriate deltas to generate a tangent function corresponding to this sequence (i.e.: tangent function with reversed time axis). In this method, y address O lies at the top of the screen while y address 511 represents the bottom. The DTED data is inverted because the pop-up adder 89 would otherwise modify the y address in a downward screen direction with increasing elevation values. The adder overflow bit in this method indicates that the y address has gone beyond the bottom of the screen; it thus serves as a video clipping signal.

This method has the advantage of filling the foreground completely with pictorial information. A ridge line will appear at the top of the screen, occuring where the last line of pop-up occurs. Since the perspective scaling factor reduces pop-up with distance, the effect is less noticeable. In fact, this effect can be deliberately used to create an artificial horizon. The top of the screen may be cropped to eliminate this effect by deleting the upper CRT scan lines.

The write address generator 83 also serves to supply the two variables (line count and pixel count) required by the various polynomial sections of the engine for its iterative additions. In the case of a standard NTSC scan, these variables each nominally take the form of a simple count from 0 to 511 in unit steps.

Look-up Table (LUT) #1 91 converts data from the chart memory 85 into a boolean combination of eight bits which are stored in the double output buffer 87 for subsequent colorization. LUT #1 91 itself does not assign colors; rather, it is programmed to provide various logical modes corresponding to the visual features desired. For example, by using a particular repetitive sequence of data values in the LUT addresses, culture planes may be effectively masked out and only the DTED data will pass, allowing the terrain to be subsequently colored according to elevation. To display altitude relative to an airplane, LUT #1 91 is preloaded with a "curve" (as viewed on a graph showing address on one axis and a stored data value on the other) which corresponds to an airplane altitude value minus each possible DTED value.

Alternatively, culture features only may be displayed by masking out the DTED data using a curve which repeats the same value for each address where only the DTED portion of the address word changes.

LUT #1 91 may be programmed to select only certain culture types appearing at specific elevations. This can be used to highlight targets of interest.

Hidden lines may be removed using the column maximum memory technique which generates a WRITE inhibit signal whenever a new pop-up y value lies below the previous maximum y value recorded in that column of the image (In this case the image must be generated from foreground to background). A simple column memory and magnitude comparator, to be described, suffice for this function.

A display address generator 93 creates a sequential numerical NTSC address scan, with full interlacing if desired. Within the DOB 87 is an address multiplexer which steers the READ (display) and the WRITE addresses to the appropriate DOB 87 half depending upon a flip-flop (95) direction pointer Q. The flip-flop 95 is keyed to toggle (exchange) the DOB 87 sections whenever the display address vertical blanking interval (VBI) coincides with the WRITE address VBI.

Engine #2 is similar to Engine #1 except that it omits the entire z axis circuitry. Engine #2 provides the roll axis transformation by reading out the DOB 87 at a slant corresponding to roll (while still maintaining axis orthogonality); this is the same operation as was used by Engine #1 for generating yaw by reading the chart memory at the slant.

LUT #2 102 provides colorization of the selected data by fanning out the eight bits into three channels (red-green-blue) of digital data with 256 possible values each. This yields a color palette where there are over 16 million possible shades, any 256 of which may appear simultaneously within the same frame.

Three dimensional imaging involving pop-up representatations can result in some features being obstructed by the pop-up representations. Often it is desireable that hidden lines of such obstructed features not appear in order to avoid confusion. An occulting device 107 is used to selectively disable a WRITE pulse from the write address generator 83 when such obstruction occurs.

The occulting device 107 operates on the writing side of the double output buffer 87. The occulting device 107 keeps a running inventory of the highest scan line used for each of the 512 image columns (x writing addresses) which compose a written image in the double output buffer 87.

By transforming the image from foreground to background, we can detect when occulation of (hidden) lines occurs by comparing the poped-up y position of the current pixel with the highest previous popped-up y position of every pixel which occupied that same column during the same frame. A pixel in the current line, as we progress towards the background, which falls below the highest pixel previously registered in the same column is a hidden (occulted) pixel and will be detected by this technique. Since it is generally desired to display the foreground at CRT bottom, then the image should be written into the double output buffer 87 from bottom towards top. It may be displayed, however, in the usual top-to-bottom direction by simply wiring the display side to count in this fashion.

When occultation does not occur, the current pixel's pop-up y value should replace the value previously recorded as the maximum for that image column.

Figure 6:
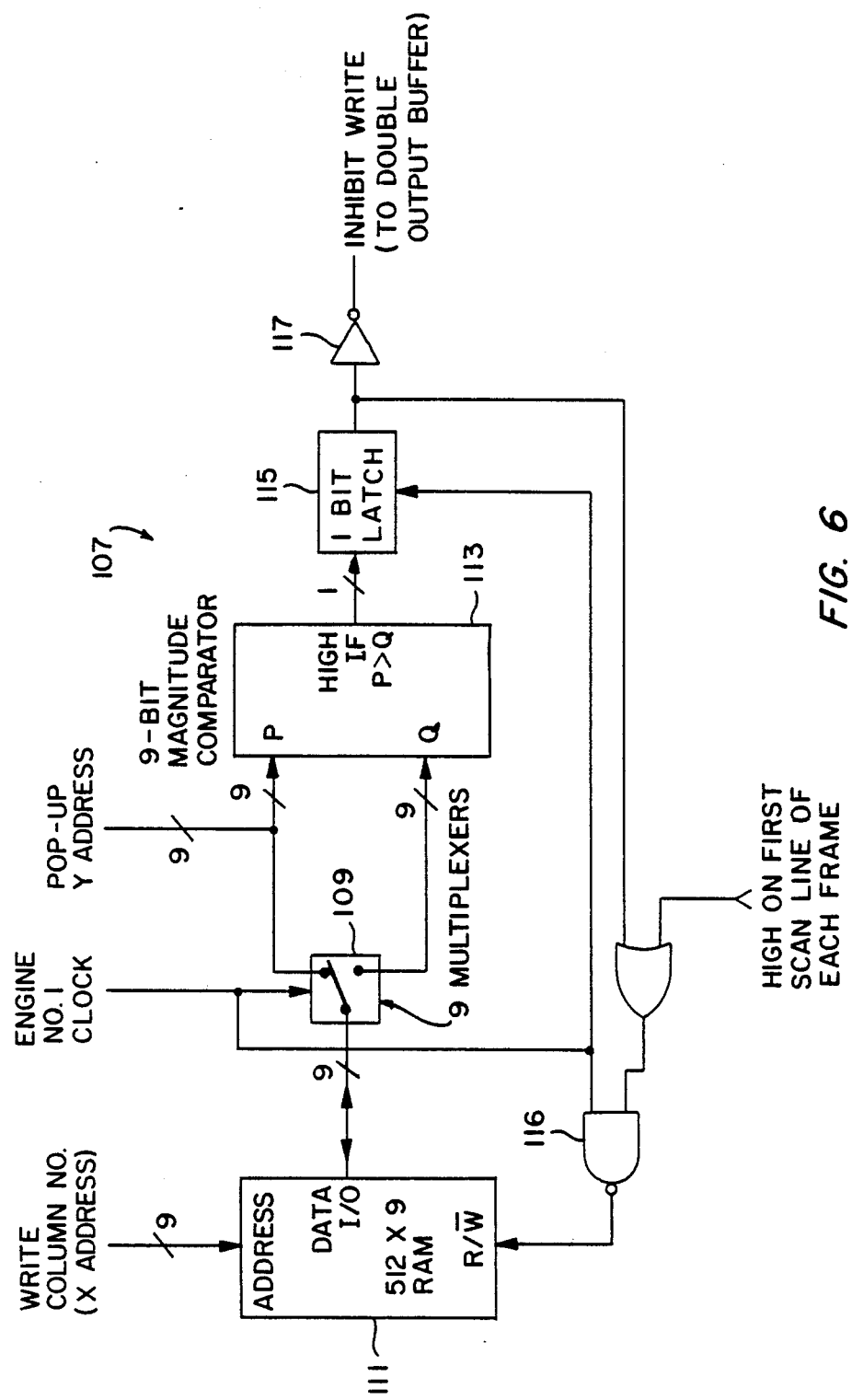
FIG. 6 is a block diagram showing details of an occulting device used with the system of FIG. 5.

The operation of the occulting device 107 is schematically shown in FIG. 6. Nine multiplexing switches, represented by toggle switch 109, are toggled in parallel at the pixel rate of Engine #1.

These switches are used to control data flow to a 512 address ×9 bit random access memory (RAM) 111 which customarily uses a common data buss for both data inut and data output. In memories where separate data inputs and outputs are provided, the multiplexor 109 is not needed.

The current x write address (image column number) is used to access a particular storage element within the RAM 111. At the beginning of each frame, each pop-up y value is written into the RAM 111 for the first scan line only. This initializes each RAM element with the starting foreground pop-up value corresponding to each image column.

For each subsequent line composing the display frame, writing into the RAM 111 will only occur if the new pop-up value exceeds the previous column maximum.

The first half-cycle of the engine clock (logic low) switches the multiplexors down towards the Q inputs of a magnitude comparator 113. This feeds the stored maximum for the current image column to one side ("Q" input) of the magnitude comparator 113. Simultaneously, the current pixel's pop-up value is compared via the "P" input. If the current pixel falls below or equals the previous maximum, then the magnitude comparator 111 outputs a zero which is subsequently written into a one-bit edge-triggered latch 115 at the end of the clock half-cycle (which is signified by a positive clock edge as the engine clock goes to a logic high state.) This forces the output of a NAND 116 gate to produce a high state (except during the first scan line per frame, as previously described), which does not allow the value in the current RAM column to be modified. Simultaneously an inverter 117 is used to generate a high state INHIBIT WRITE signal, which creates occultation by preventing this hidden pixel from being written into the double output buffer 87.

If, however, the current pixel pop-up exceeds the previous stored maximum, then we must permit writing into the double output buffer 87 as well as updating the stored column maximum value with the current new value. This is accomplished by the comparator 113 which produces a high state output whichis subsequently stored and transmitted by the one-bit latch to the NAND 116 gate. The engine clock is high on the next half-cycle, which (in concert with the latched bit) allows the current pop-up value to be written over the old. On this second half-cycle the multiplexors 109 are switched upwards towards the P inputs of the magnitude comparator 113. Since the pop-up data also is connected to this set of magnitude P inputs, this new data is written into the RAM 111. During this half-cycle the magnitude comparator 113 is not used and is disreagarded since its output has not been clocked into the one-bit latch 115.

FIG. 7 is a diagram representing storage registers or latches 121-125 and an adder 127 required for a five-term polynomial. This is one of four sections required (to solve the desired four polynomials). It is easy to imagine additional stages of latches required for the solution of a higher order polynomial by simply adding more registers and switches, following the same scheme of switches shown.

Register 121 contains the only differential which does not increment.

In clock step 1, registers 121 and 122 are added by adder 127, the results going to a temporary latch register 130. In step 2, registers 121 and 122 are still being added, but latch 130 is taken out of the latch (WRITE) mode before the two inputs from registers 121 and 122 are removed from the adder 127. This sequence assures that latch 130 stores the value while the output of adder 127 is stable.

In clock step 3, the temporary value in latch 130 is written over the old value in register 122.

This same cycle repeats, this time using registers 122 and 123 as the inputs to adder 127. The output from latch 130 finally is written over the old value in register 123. This process can continue onward, limited only by the time available and the number of storage registers provided. Only one adder 127 and one temporary storage latch 130 are required for each polynomial engine.

Every register (except register 121, which is never changed) is used for four clocks periods, taking part in two add operations. Since the order of the operands in the addition is not important, it is possible to always switch a particular register to the same operand input, regardless of the other addition (e.g.: registers 122+123 followed by registers 124+123). This saves considerable expense in multiplexing the lines.

There are two direct methods of actually constructing the system just described:

(i) use actual registers or latches and a decoded sequence generator of twelve or more steps as shown in FIG. 7;

(ii) substitute a single memory for all registers, and provide addresses to the RAM instead of register switching pulses in order to access the next bytes required for sequential add. If two RAMs are used (one for the "even" registers and one for the "odd") then the switching is further simplified. This is shown in FIGS. 8.

The former method is conceptually the simpler but requires considerable multiplexing hardware for the numerous data lines. The latter method using a single RAM for both "even" and "odd" register words is complex since both must be available for simultaneous addition, yet they must be modified individually during the writing operations. This requires additional temporary storage and cycle time.

Figure 9:
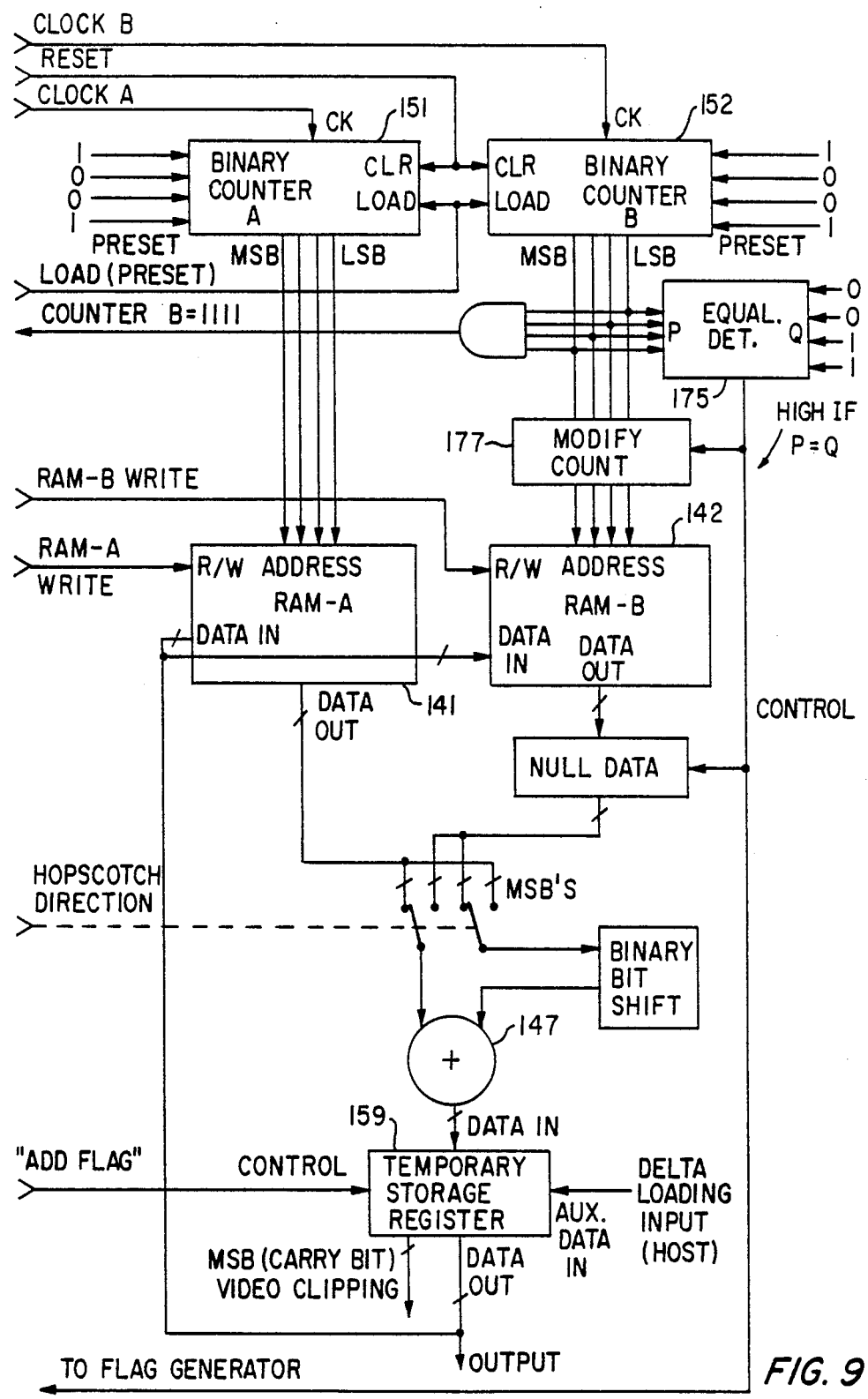
FIG. 9 is a block diagram of a sub-engine section in detail.

The hybrid solution using two RAMs 141, 142 (even and odd) shown in FIGS. 8 and 9 provides an elegant solution. In this scheme the addresses provided to the two RAMs 141, 142 increment in a "hopscotch" pattern as shown in FIGS. 8. That is, one RAM (141) stores all the even register words, the other (142) only the odd. The data outputs from the two RAMs 141, 142 are (indirectly) wired to the inputs of adder 147 which provides an added output to the RAMs 141, 142. This indirect wiring is not essential but results in an improvement which later will be described. Therefore, the adder 147 output is fed back to, and written over the same address as, the RAM 141 or 142 which was most recently incremented.

Referring to FIGS. 8.1 and 8.2, the values of a first address location in RAM 141 and a first address location in RAM 142 are added and loaded to the first address location in RAM 141. This new value in the first address location of RAM 141 is added to the value of the second address location in RAM 142 and loaded into the second address location of RAM 142, and so on.

Also, it becomes feasible to hard-wire the address lines from two binary counters or address generators 151, 152 to their respective RAMs 141, 142, as shown in FIG. 9. Again, we eliminate more MUX switches.

Lastly, we can increment the binary counters 151, 152 in hopscotch fashion merely by MUXing a single clock line between "clock A" and "clock B".

It has been found that the upper deltas must contain numbers on the order of $10^{-6}$ to $10^{-9}$ to produce images with natural perspective. This can be achieved by either using a very long binary word, a complex floating point architecture to achieve the requisite fractional precision, or else by using a smaller word which is shifted (divided) for each iterative addition. This shift must be applied to only one input side of the engine adder at any moment, but the side being shifted must alternate in synchronization with the hopscotch flag.

The equations with define the new engine delta process are:

| ("standard" sequence) | (new shift sequence) |
| --- | --- |
| D2 = D2 + D1 | D2 = D2 + D1/Q |
| D3 = D3 + D2 | D3 = D3 + D2/Q |
| D4 = D4 + D3 | D4 = D4 + D3/Q |
| D5 = D5 + D4 | D5 = D5 + D4/Q |
| D6 = D6 + D5 | D6 = D6 + D6/Q | where Q=division by binary shift

This arrangement of shifting only the term which is not redefined in terms of its own previous value preserves the exponential growth characteristic of each delta while scaling down its effect on the accumulated sum.

A method for implementing this alternated shift with a minimum of multiplexing hardware is shown by FIG. 8 in which the deltas are stored in RAMs 141, 142. By synchronization using the hopscotch direction pointer, the left input of the adder 147 always receives the unshifted delta while the right side always receives the shifted component. This arrangement minimizes the number of multiplexing switches required since the shift effectively eliminates a number of bits. By diverting the shift term always to the right side, we can eliminate a number of switches.

Since the engine synthesizes negative numbers through twos complement notation, we must tie all upper bits of the right adder input together so that they all receive the same most-significant bit of the shifted term. This results in the ability to generate (after shift) either very small positive numbers or very small negative numbers.

The sub-engine of FIG. 9 is the numeric computation section that can be used to generate a set of polynomial solutions (one of which incorporates a virtual pixel multiplication). A sub-engine may be used for x, y, or z axis transformation. A simple flag generator may provide the control and timing pulses necessary to operate a sub-engine. Typically, three sub-engines (one for x, y, and z axes each) are driven by a single flag generator.

The figure shows a portion of the flag generator consisting of binary counters 151, 152 an equality detector 175 and a count modifier 177.

In normal operation, a host would download new deltas into each RAM-A and RAM-B once per video frame, preferably during the vertical blanking interval. Then during the picture period, the flag generator takes over control of each sub-engine (operating in tandem).

The host downloads the deltas by first clearing both counters (151, 152) using a single pulse on a RESET line. In practice, the counters 151, 152 are 4 bit binary counters which address the RAMS having four address lines each, some of which (the lower addresses) are unused. A load pulse is sent to immediately preset the first used addresses into the counters. Depending upon the application, we may wish to expand the number of delta terms in each polynomial. This may easily be done by altering the loaded preset values.

The hopscotch method of addressing is used, requiring counters 151 and 152 whose addresses are alternately incremented using the two clock input lines. The host loads the deltas via the delta loading input, using the temporary storage register 159 (e.g.: 74HC298) which contains both a multiplexor and a latch. The deltas are written individually using the separate RAM-A WRITE and RAM-B WRITE lines. When writing of the delta is complete, the counters are cleared with a reset pulse.

During the image period of the frame, a complete set of new polynomial solutions is required once per scan line. This is done during the horizontal retrace period. The counter addresses are stepped alternately which causes the overflow control process to occur, resulting in the modified equations described previously.

At each address step, the output of the adder 147 is latched by the temporary storage register 159 after sufficient time has elapsed to satisfy the adder 147. At this moment the output of the register 159 is effectively isolated from any changes occuring at the adder inputs. A WRITE strobe is then sent to the appropriate RAM 141 or 142 using the WRITE lines. The new iterated addition value is stored over the old. During this WRITE operation, any change in the data fed to the adder 147 is isolated by the temporary storage register 159, eliminating a feedback condition.

The output of counter 152 is monitored within the flag generator by circuits for two special addresses. The first of these is the address where the result of the "top" polynomial (lower-address polynomial) must be transferred to the accumulator, which is in reality merely the last address (1111) of RAM-B 142. This is accomplished by detecting the address where the result would normally be carried down to the next address (the delta D1 of the bottom polynomial) and instead substituting the writing address of the accumulator location (1111). In practice, gates are used to change RAM-B 142 address 1100 into address 1111. Finally, in order to transfer the data without modification by the adder it is necessary to null one of its inputs to zero (using a tri-state device and pull-down resistors or some similar means) while overriding the direction sent to the overflow multiplexing switches so that the data is not divided during this special WRITE. This is easily accomplished within the flag generator using simple gates.

The second unusual address is when counter 152 reaches 1111, its terminal count. A simple AND gate detects this and informs the flag generator to halt counting. At this point the flag generator waits until the end of the horizontal retrace period and then begins the pixel-by-pixel addition (virtual multiplication) which occurs during the image portion of the next scan line, using ADD and WRITE pulses while maintaining the same addresses in counters 151 and 152. In practice, there is ample time to extend the length of the delta series within each retrace period as well as perform refresh operations if DRAMs are used anywhere in the system.

Furthermore, the computation process can be performed even more frequently, up to pixel-rates, using appropriate emitter coupled logic (ECL) or similar high speed technology. When compared to conventional microprocessor techniques in transforming images even using the same solid-state technology the engine enjoys a very large speed advantage.

In order to achieve object z-axis transformation, the write address to the DOB must be modified in the manner shown by FIGS. 1 and 5, which show a form, represented by the read-locus trapezoid or trapezium 241 placed into chart memory 34, corresponding to a bit map memory buffer 85 in FIG. 5 in a raster scan pattern. In order to provide third dimensional perspective, it is necessary to modify the output of the write address counter y output by adding a z-axis modification to the y output prior to writing to the double output buffer. This is accomplished by modifying the writing sequence in the bit map output buffer 87 to a modified raster scan, as represented by blocks 35, 36. The transformations of block 35 adjusts the storing of data on the output buffer 85 in a pattern dictated by such information as altitude data which is conditioned to conform with the perspective effect, via a conditioning signal from the z sub-engine. Referring to FIG. 5, the transformation represented by blocks 35 and 36 is accomplished by taking elevation data from the chart memory output buffer 85. The host 240 receives position input data from an external source such as an aircraft's flight computer 242 and provides deltas to the z sub-engine which modifies the altitude data being read out by the x and y sub-engines from the chart memory 85. This modification scales the altitude pop-up modulation to conform to the x and y perspective at each point. A multiplying device 84 is used to scale the z data while an adder 89 creates the vertical pop-up modulation.

In the event that the image is to rotate with vehicle roll, the controller provides a roll axis position inputs from the flight computer 242, to Engine #2, Engine #2 is then able to slant the displayed image as described earlier.

FIG. 10 illustrates how several sub-engine sections 261, 262, 263 may be connected to a common flag generator 265 and operated in tandem. Each sub-engine contains hardware to satisfy one set of two polynomials as previously described. For example, the x sub-engine evaluates:

$$x = P_4 + J^* P_5$$

The output is fed, in the case of the x and y sub-engines 261, 262, to the address inputs of the chart memory bit map 85 (FIG. 5). In the case of the z axis sub-engine 263, the output is a scaling factor which is fed to a multiplier such as multiplier 84 which scales the altitude data corresponding to the particular x/y address point being read.

The common flag generator 265 (including counters 151 and counters 152 of FIG. 9 for the address sequencing for hopscotch RAM-A and RAM-B control) operates all sub-engines via a multiplexor 269. This multiplexor 269 allows the host computer 240 or other switching device to take over control of the sub-engines 261, 262, 263, preferably only during the vertical blanking interval ("VBI"), thereby loading the deltas directly into each sub-engine 261, 262, 263 without interference from the flag genrator 265.

The write address counter 83 is supplied with a crystal clock 271 and generates a (preferably non-interlaced) x and y linear scan pattern for writing the results of the engine transform into the double output buffer 87. The same counting circuitry is used to control the generation of the VBI, the switching of the multiplexor 269, and may even be used to assist in generating the flags themselves.

I claim:

1. Method of providing an image on an electronic display, characterized by:
    (a) encoding the image as a series of data elements corresponding to coordinate locations;
    (b) storing the data elements in a first memory;
    (c) generating a first scan pattern;
    (d) selecting a scan transformation;
    (e) generating a secondary scan pattern by modulating the first scan pattern;
    (f) obtaining the data elements corresponding to the secondary scan pattern from the first memory; and
    (g) displacing the secondary scan pattern to generate representations of third dimensional image features by modulating the secondary scan pattern with predeterminted bits of said data elements to thereby provide an image signal showing displacement from the secondary scan pattern for display on a display surface.

2. Method as described in claim 1 further characterized by:
    storing said secondary pattern in a second memory for subsequent readout.

3. Method as described in claim 2, further characterized by:
    the readout of said secondary pattern being accomplished by said reading of the scan pattern; and
    said reading effecting a raster scan of the secondary scan pattern.

4. Method as described in claim 3, further characterized by:
    the modulation of the secondary scan pattern displacing the display from the secondary scan pattern to provide representation of third dimensional features on a two directional display medium in which the third dimensional features are displaced from the secondary display pattern prior to displacement.

* * * * *